United States Patent
Turtinen et al.

(10) Patent No.: US 11,683,849 B2
(45) Date of Patent: Jun. 20, 2023

(54) REDCAP UE IDENTIFICATION

(71) Applicant: Nokia Technologies Oy, Espoo (FI)

(72) Inventors: Samuli Heikki Turtinen, Ii (FI); Jussi-Pekka Koskinen, Oulu (FI); Ahlem Khlass, Nozay (FR)

(73) Assignee: Nokia Technologies Oy, Espoo (FI)

( * ) Notice: Subject to any disclaimer, the term of this patent is extended or adjusted under 35 U.S.C. 154(b) by 203 days.

(21) Appl. No.: 17/211,131

(22) Filed: Mar. 24, 2021

(65) Prior Publication Data
US 2022/0312530 A1    Sep. 29, 2022

(51) Int. Cl.
| | |
|---|---|
| *H04W 76/19* | (2018.01) |
| *H04W 8/24* | (2009.01) |
| *H04W 76/11* | (2018.01) |
| *H04W 80/02* | (2009.01) |
| *H04W 76/27* | (2018.01) |

(52) U.S. Cl.
CPC .............. *H04W 76/19* (2018.02); *H04W 8/24* (2013.01); *H04W 76/11* (2018.02); *H04W 76/27* (2018.02); *H04W 80/02* (2013.01)

(58) Field of Classification Search
CPC ....... H04W 76/19; H04W 8/24; H04W 76/11; H04W 76/27; H04W 80/02
See application file for complete search history.

(56) References Cited

U.S. PATENT DOCUMENTS

| | | | | |
|---|---|---|---|---|
| 2008/0186946 A1* | 8/2008 | Marinier | ............... | H04W 28/06 370/349 |
| 2017/0273072 A1* | 9/2017 | Wittberg | ............... | H04W 76/27 |
| 2018/0206290 A1* | 7/2018 | Dai | ........................ | H04W 76/27 |
| 2019/0037605 A1* | 1/2019 | Agiwal | ................. | H04W 76/27 |
| 2019/0335506 A1 | 10/2019 | Agiwal et al. | | |
| 2019/0335508 A1* | 10/2019 | Agiwal | ................. | H04W 28/06 |
| 2020/0137798 A1* | 4/2020 | Bergquist | .............. | H04L 69/324 |
| 2020/0169966 A1* | 5/2020 | Chang | ................... | H04W 28/02 |
| 2020/0267772 A1* | 8/2020 | Jung | .................... | H04W 74/006 |
| 2021/0195654 A1* | 6/2021 | Lei | ..................... | H04W 72/0413 |
| 2021/0227451 A1* | 7/2021 | Babaei | ............. | H04W 74/0833 |
| 2021/0360634 A1* | 11/2021 | Huang | .................. | H04L 1/1664 |
| 2021/0368547 A1* | 11/2021 | Kadiri | ................... | H04L 5/0044 |
| 2022/0015150 A1* | 1/2022 | Ye | ..................... | H04W 74/0833 |

(Continued)

FOREIGN PATENT DOCUMENTS

CA    2 705 343 A1    7/2009

OTHER PUBLICATIONS

RP-193238 "New SID on Support of Reduced Capability NR Devices" 3GPP TSG RAN Meeting #86 Sitges, Spain, Dec. 9-12, 2019.

(Continued)

*Primary Examiner* — Will W Lin
(74) *Attorney, Agent, or Firm* — Harrington & Smith

(57) ABSTRACT

During an RRC Connection setup or resume procedure, a user equipment may explicitly identify itself to the network using Msg3. Rather than using the spare bit or including additional bits in Msg3, one or more values of the LCID field of the MAC sub-header of the MAC PDU may be used to identify a reduced capability user equipment. The one or more LCID field values that can identify a reduced capability user equipment may also be configured to identify a common control channel service data unit size. A plurality of LCID field values may be defined to identify varies types of RedCap UEs.

20 Claims, 8 Drawing Sheets

(56) References Cited

U.S. PATENT DOCUMENTS

| | | | |
|---|---|---|---|
| 2022/0141883 A1* | 5/2022 | Lee ................... | H04W 56/0045 370/329 |
| 2022/0232623 A1* | 7/2022 | Lee ................... | H04W 74/0866 |
| 2022/0279595 A1* | 9/2022 | Jang ..................... | H04W 48/18 |
| 2022/0286355 A1* | 9/2022 | Park ..................... | H04W 76/10 |
| 2022/0287102 A1* | 9/2022 | Futaki ................... | H04L 5/0092 |
| 2022/0312298 A1* | 9/2022 | Palle Venkata ....... | H04W 48/10 |

OTHER PUBLICATIONS

3GPP TR 38.875 V2.0.0 $3^{rd}$ Generation Partnership Project; Technical Specification Group Radio Access Network; Study on Support of Reduced Capability NR Devices (Release 17)) May 2021.

"Early identification of Redcap UEs", Lenovo, Motorola Mobility, 3GPP TSG RAN WG2 Meeting #112-e, R2-2009670, Nov. 2020, 4 pages.

"Summary of [AT113-e][108][REDCAP] UE identification and access restriction", Rapporteur (Ericsson), 3GPP TSG-RAN WG2 #113-e, R2-2102018, Feb. 2021, 44 pages.

* cited by examiner

700

Determine a logical channel identifier, wherein the logical channel identifier indicates a common control channel and indicates a type of the user equipment — 710

Transmit a message comprising the determined logical channel identifier — 720

Receive, from a user equipment, a message comprising a logical channel identifier, wherein the logical channel identifier indicates a common control channel and indicates a type of the user equipment — 810

Determine whether the user equipment comprises a reduced capability user equipment based on the logical channel identifier — 820

FIG. 8

REDCAP UE IDENTIFICATION

BACKGROUND

Technical Field

The example and non-limiting embodiments relate generally to identification of communication devices and, more particularly, to identification of reduced capability user equipment while in an RRC idle or inactive state.

Brief Description of Prior Developments

It is known, for a user equipment, to perform a radio resource control connection setup, resume, or reestablishment procedure.

BRIEF DESCRIPTION OF THE DRAWINGS

The foregoing aspects and other features are explained in the following description, taken in connection with the accompanying drawings, wherein:

FIG. 7 is a flowchart illustrating steps as described herein; and

FIG. 8 is a flowchart illustrating steps as described herein.

DETAILED DESCRIPTION OF EMBODIMENTS

Figure 1:
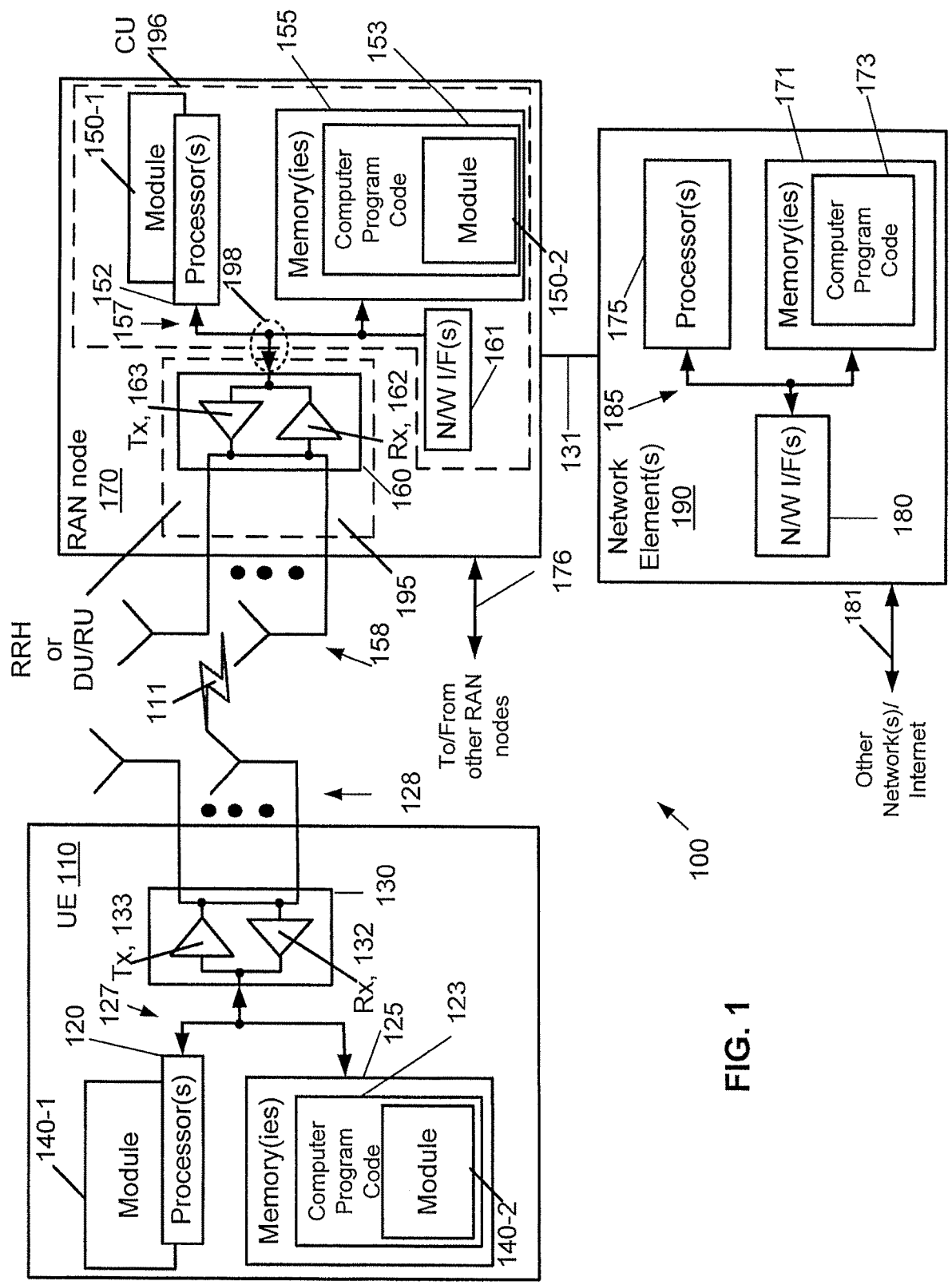
FIG. 1 is a block diagram of one possible and non-limiting exemplary system in which the exemplary embodiments may be practiced.

The following abbreviations that may be found in the specification and/or the drawing figures are defined as follows:
3GPP third generation partnership project
5G fifth generation
5GC 5G core network
AMF access and mobility management function
AS access stratum
BWP bandwidth part
CCCH common control channel
CCE control channel element
C-RNTI cell radio network temporary identifier
CU central unit
DRX discontinuous reception
DU distributed unit
eLCID extended logical channel ID
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD frequency division duplex
gNB (or gNodeB) base station for 5G/NR, i.e., a node providing NR user plane and control plane protocol terminations towards the UE, and connected via the NG interface to the 5GC
I/F interface
IAB integrated access and backhaul
IE information element
IOT Internet of Things
L1 layer 1
LCID logical channel ID
LPWA low power wide area network
LTE long term evolution
MAC medium access control
MCS modulation and coding scheme
MME mobility management entity
NAS non access stratum
ng or NG new generation
ng-eNB or NG-eNB new generation eNB
NR new radio
N/W or NW network
PDCCH physical downlink control channel
PDCP packet data convergence protocol
PDU protocol data unit
PHY physical layer
PRACH physical random access channel
PUSCH physical uplink shared channel
RA random access
RACH random access channel
RAN radio access network
RedCap reduced capability (i.e. device/UE)
RF radio frequency
RLC radio link control
RNA RAN notification area
RNAU RAN notification area update
RRH remote radio head
RRC radio resource control
RRM radio resource management
RS reference signal
RU radio unit
Rx receiver
SA standalone
SAP service access point
SCH shared channel
SDAP service data adaptation protocol
SDU service data unit
SGW serving gateway
SI study item
SMF session management function
SSB synchronization signal block
TM transparent mode
Tx transmitter
UAC unified access control
UE user equipment (e.g., a wireless, typically mobile device)
UPF user plane function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be a base station (e.g. 5G, 6G, etc.), for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any, type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. In addition, various embodiments of the user equipment 110 can include, but are not limited to, devices integrated into vehicles, infrastructure associated with vehicular travel, wearable devices used by pedestrians or other non-vehicular users of roads, user equipment unrelated to traffic users, public safety user equipment and/or other commercial user equipment, sensors having wired or wireless communication capabilities, Internet of Things (IoT) devices, devices capable of receiving information from sensors and having wireless communication capabilities, etc.

Features as described herein generally relate to enabling of identification of reduced capability (RedCap) devices and network access control. As noted in 3GPP TR 38.875, a RedCap UE may refer to an NR UE with reduced capabilities. It was introduced in 3GPP specifications Release 17 for enabling the expansion of 5G use cases (including wearables, video surveillance, and Industrial wireless sensors networks) which are not yet best served by current NR specifications. RedCap devices may include devices with relatively low complexity, cost, and/or size. Use cases for RedCap UE and example embodiments of the present disclosure may include, but are not limited to, industrial Internet of Things (IoT) sensors, wireless sensors, video surveillance devices, Internet of Things (IoT) devices, wearables, and/or devices used for transportation, tracking, infrastructure, agriculture, smart cities, etc. Wearables may include sensors in contact with or near skin, smart fabric, heart rate monitors, temperature monitors, etc. RedCap devices may or may not conform to the following description from RP-193238:

" . . . Generic requirements:
Device complexity: Main motivation for the new device type is to lower the device cost and complexity as compared to high-end eMBB and URLLC devices of Rel-15/Rel-16. This is especially the case for industrial sensors.
Device size: Requirement for most use cases is that the standard enables a device design with compact form factor.
Deployment scenarios: System should support all FR1/FR2 bands for FDD and TDD.
Use case specific requirements:
Industrial wireless sensors: Reference use cases and requirements are described in TR 22.832 and TS 22.104: Communication service availability is 99.99% and end-to-end latency less than 100 ms. The reference bit rate is less than 2 Mbps (potentially asymmetric e.g. UL heavy traffic) for all use cases and the device is stationary. The battery should last at least few years. For safety related sensors, latency requirement is lower, 5-10 ms (TR 22.804)
Video Surveillance: As described in TS 22.804, reference economic video bitrate would be 2-4 Mbps, latency<500 ms, reliability 99%-99.9%. High-end video e.g. for farming would require 7.5-25 Mbps. It is noted that traffic pattern is dominated by UL transmissions.
Wearables: Reference bitrate for smart wearable application can be 10-50 Mbps in DL and minimum 5 Mbps in UL and peak bit rate of the device higher, 150 Mbps for downlink and 50 Mbps for uplink. Battery of the device should last multiple days (up to 1-2 weeks) . . . "

In example embodiments of the present disclosure, RedCap UE identification and network access control may be enabled when UE attempt access to the network while in an RRC_IDLE or RRC_INACTIVE state. More specifically, in some example embodiments RedCap UE identification may be enabled in MsgA of a 2-step Random Access (RA) procedure or in Msg3 of a 4-step Random Access procedure. In an example embodiment of the present disclosure, an indication of the RedCap UE may be conveyed in a logical channel ID (LCID) field of a subheader of a medium access control (MAC) service data unit (SDU) or MAC control element (CE).

2-step RA procedure may involve UE sending MsgA, which includes Random Access preamble and a physical uplink shared channel (PUSCH) transmission, which may include data. The network then may respond to the UE MSGA transmission by sending MsgB. 4-step RA procedure may involve UE sending Msg1 which includes Random Access preamble; the network may respond to the Msg1 transmission by Msg2 or Random Access Response which includes transmission resources for Msg3 and, for example, timing advance command; the UE may then transmit Msg3 on the assigned resources; if the network is able to decode the Msg3, it can respond with Msg4, which is also called as contention resolution. Examples of 4-Step RA procedure are described below with references to FIGS. 3 and 4. With regards to the discussions in this description, the example embodiments as hereinafter described in terms of Msg3 are equally applicable to MsgA, and vice versa.

In 3GPP Release 17, (RP-193238), a work item on the support for RedCap devices (also known as NR-Light) has been approved. The following objectives have been identified for supporting RedCap devices:

" . . . Identify and study potential UE complexity reduction features, including:

Reduced number of UE RX/TX antennas
UE Bandwidth reduction
Note: Rel-15 SSB bandwidth should be reused and L1 changes minimized
Half-Duplex-FDD
Relaxed UE processing time
Relaxed UE processing capability
Note1: The work defined above should not overlap with LPWA use cases. The lowest capability considered should be no less than an LTE Category 1bis modem.
Study UE power saving and battery lifetime enhancement for reduced capability UEs in applicable use cases (e.g. delay tolerant):
Reduced PDCCH monitoring by smaller numbers of blind decodes and CCE limits.
Extended DRX for RRC Inactive and/or Idle
RRM relaxation for stationary devices
Study functionality that will enable the performance degradation of such complexity reduction to be mitigated or limited, including:
Coverage recovery to compensate for potential coverage reduction due to the device complexity reduction.
Study standardization framework and principles for how to define and constrain such reduced capabilities—considering definition of a limited set of one or more device types and considering how to ensure those device types are only used for the intended use cases.
Study functionality that will allow devices with reduced capabilities to be explicitly identifiable to networks and network operators, and allow operators to restrict their access, if desired.
Note 2: Potential overlap with coverage enhancements study is discussed and resolved in RAN #87.
Note 3: Coexistence with Rel-15 and Rel-16 UE should be ensured
Note 4: This SI should focus on SA mode and single connectivity . . . "

The objective to "Study functionality that will allow devices with reduced capabilities to be explicitly identifiable to networks and network operators, and allow operators to restrict their access, if desired" may be enabled by example embodiments of the present disclosure.

In RAN2 #111-e, the following agreements have been made:

" . . . An indication in system information is needed to indicate whether a REDCAP UE can camp on the cell. FFS whether the indication is explicit or implicit.

UAC mechanism also apply to REDCAP UEs.

System information indicates whether REDCAP operation is allowed/barred on a frequency. FFS reuse the legacy intraFreqReselection or introduce separate flag Further discuss enhancement of UAC for REDCAP UEs, including e.g.:
a. define new Access Identity for REDCAP UEs
b. define new Access Categories for REDCAP UEs (for any final decision we need to check with SA1 and/or CT1) . . . "

In RAN1 #102-e, the following agreements were made with regard to UE identification for RedCap UEs:

" . . . Further study the options for identification of RedCap UEs, including the following indication methods:
Opt. 1: During Msg1 transmission, e.g., via separate initial UL BWP, separate PRACH resource, or PRACH preamble partitioning.
Opt. 2: During Msg3 transmission.
Opt. 3: Post Msg4 acknowledgment.
E.g., during Msg5 transmission or part of UE capability reporting.
Opt. 4: During MsgA transmission (subject to support of if 2-step RACH)
Other options are not precluded.
Note: This study intends to establish feasibility of, and pros and cons for the identified options from RAN1 perspective, without any intention of down-selection without guidance from RAN2.
Conclusion:
RAN1 to wait for further progress in RAN2 on the issues of temporary access barring and congestion control . . . "

Example embodiments of the present disclosure may relate to identification of RedCap UEs during MsgA and/or Msg3 transmission.

In 3GPP RAN2 #112 e-meeting, the following agreements were made on RedCap Identification and access restriction:

" . . . Whether it is needed to identify RedCap UEs during Msg3 from RAN2 perspective or not depends on the following two aspects:
Whether Msg4/5 special handing for RedCap UE is needed, pending RAN1
Whether there is a need to reject part of RedCap UEs in addition to cell barring and UAC mechanism
Include the possible options (msg1, msg3, msg5) in the TP without saying anything on RAN2 preferences on when identification is required
Do not send a LS on RedCap UE identification to RAN1 and wait for more RAN1 process
Postpone the LS to SA1 on UAC enhancement for RedCap UEs.
Postpone the discussion on the camping indicator for RedCap UEs to the WI phase.
Postpone the discussion on intraFreqReselection indicator for RedCap UEs to the WI phase . . . "

RAN1 studied feasibility, necessity, pros, and cons from RAN1 perspective for these different options for identification of RedCap UEs. For option 2 (i.e. the UE identification happens during MSG3 transmission), the following methods may be possible for enablement:

TABLE 1

| Methods | Pros. | Cons. |
| --- | --- | --- |
| Method 1: Using the spare bit in existing Msg3 definition | Limited impact to RAN1 specifications if only the spare bit in Msg3 payload is utilized | If only the spare bit in Msg3 is used, it would consume the single spare bit currently available in Msg3 payload, and this may not be desirable. |
| Method 2: Extending the Msg3 size to carry additional one or more bits, indicating RedCap UE type(s). | The option of extending Msg3 size may offer good scalability in the number of bits for such UE identification; e.g., if sub-types of RedCap device types (if defined) are to be indicated in Msg3. | If extended Msg3 size is introduced, mechanisms to enable detection between use of legacy Msg3 and extended Msg3 definitions necessary. |

Table 1 is included from 3GPP TR 38.875: "Study on support of reduced capability NR devices" (Release 17). As noted in Table 1, using the spare bit of the existing RRC-SetupRequest or RRCResumeRequest (carried in MsgA/Msg3) might not be preferred, as it would use the only spare bit in those messages. As a result, any essential additions later on could not be introduced. As noted in Table 1, extending Msg3's size to carry additional bit(s) configured to indicate RedCap UE type(s) may result in needing further mechanisms to identify which MSG3 type/size is used. Accordingly, worse coverage might result where more information is required to be encoded into Msg3. It may be noted that coverage may be worse for RedCap UE than for non-RedCap UE even without implementation of Method 2 of Table 1.

Example embodiments of the present disclosure may provide an alternative to Method 1 and Method 2 of Table 1. The alternative method may enable the NW to identify RedCap UEs based on the RRC message content without using the spare bit of the RRC messages and without extending MsgA/Msg3 size with additional bit(s).

Example embodiments of the present disclosure may involve UE identification being performed in Msg3 at the latest (or PUSCH part of MsgA). In example embodiments, Msg3-based identification may be mandatory for the UE; the Msg1 based solution may be optional for the NW to configure, depending on the scenario. In example embodiments, UE identification may happen/occur during MsgA/Msg3 transmission, i.e. during a RRC resume procedure (when the UE is in RRC_INACTIVE state) or during RRC establishment procedure (when the UE is in RRC_IDLE state).

Figure 2:
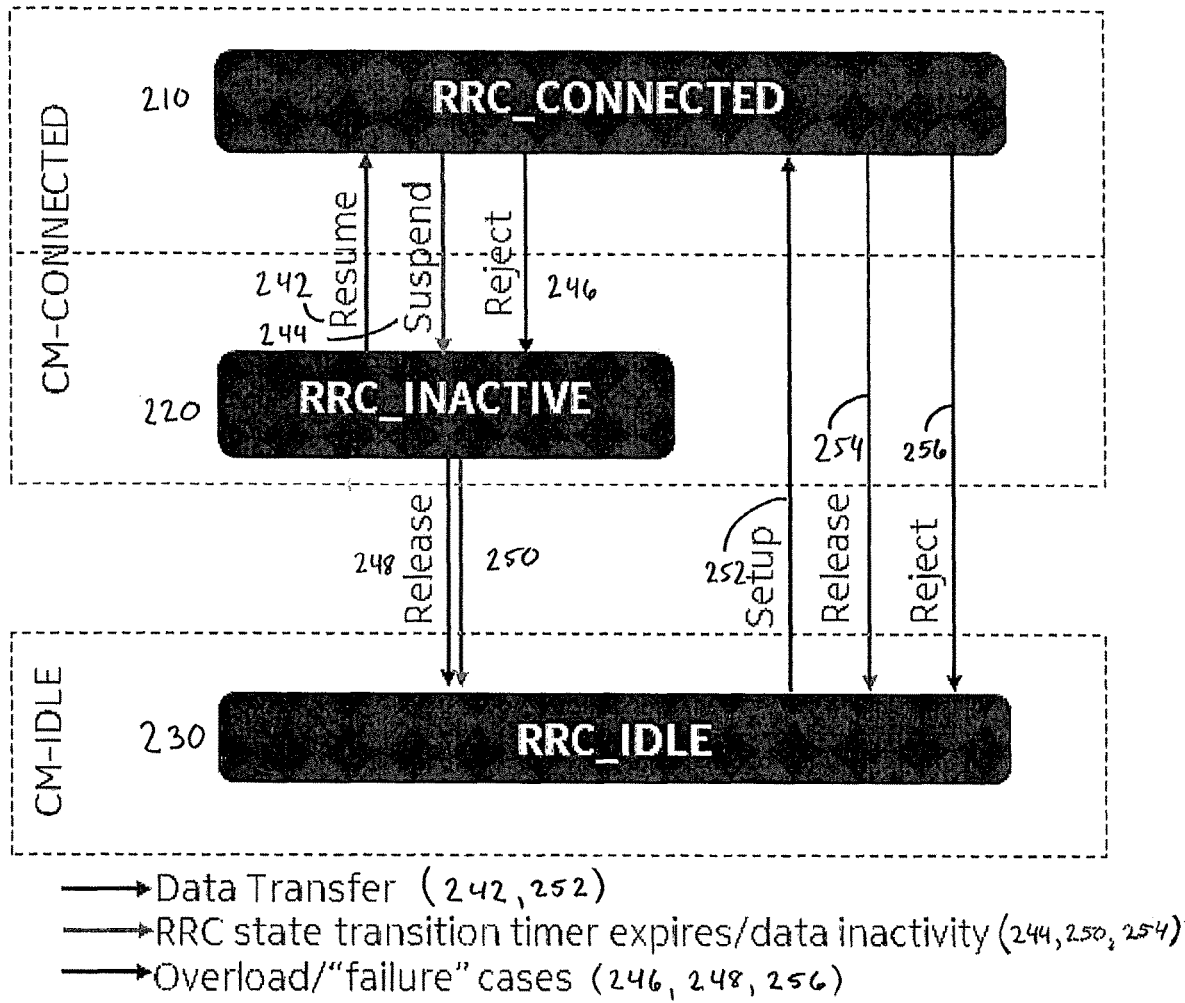
FIG. 2 is a diagram illustrating features as described herein.

Referring now to FIG. 2, illustrated is an example RRC state machine in 5G NR with state transitions. A UE may be in an RRC_CONNECTED state (210), an RRC_INACTIVE state (220), or an RRC_IDLE state (230). When a UE is in RRC_INACTIVE state (220), the radio connection may only be suspended while the core network connectivity is maintained active, i.e. UE is kept in Connection Management (CM)-CONNECTED state. A UE Access Stratum (AS) context (referred to as UE Inactive AS context) may be stored at both UE and anchor gNB sides for the fast resume of a suspended connection (with Resume message 242). Based on this retained information, the UE may resume the radio connection with a much lower delay and associated signaling overhead as compared to a UE in RRC_IDLE state (230) that requires establishment of a new connection to both the radio and core network (with Setup message 252).

After a certain data activity (which may be timer-based), the UE may be moved from RRC_CONNECTED state (210) to RRC_INACTIVE (220) or RRC_IDLE (230) state. For example, this state transition may occur with a suspend message (244) (or suspend carried over a release message) or a release message (254), respectively. A UE in RRC_INACTIVE state (220) may also transition to RRC_IDLE state (230) due to timer expiration and/or data inactivity with a release message 250.

State transition may also occur due to overload or "failure" cases. A UE in RRC_CONNECTED state 210 may transition to RRC_INACTIVE state (220) with a Reject message (246) or to RRC_IDLE state (230) with a Reject message (256). A UE in RRC_INACTIVE state (220) may transition to RRC_IDLE state (230) with a Release message (248).

Figure 3:
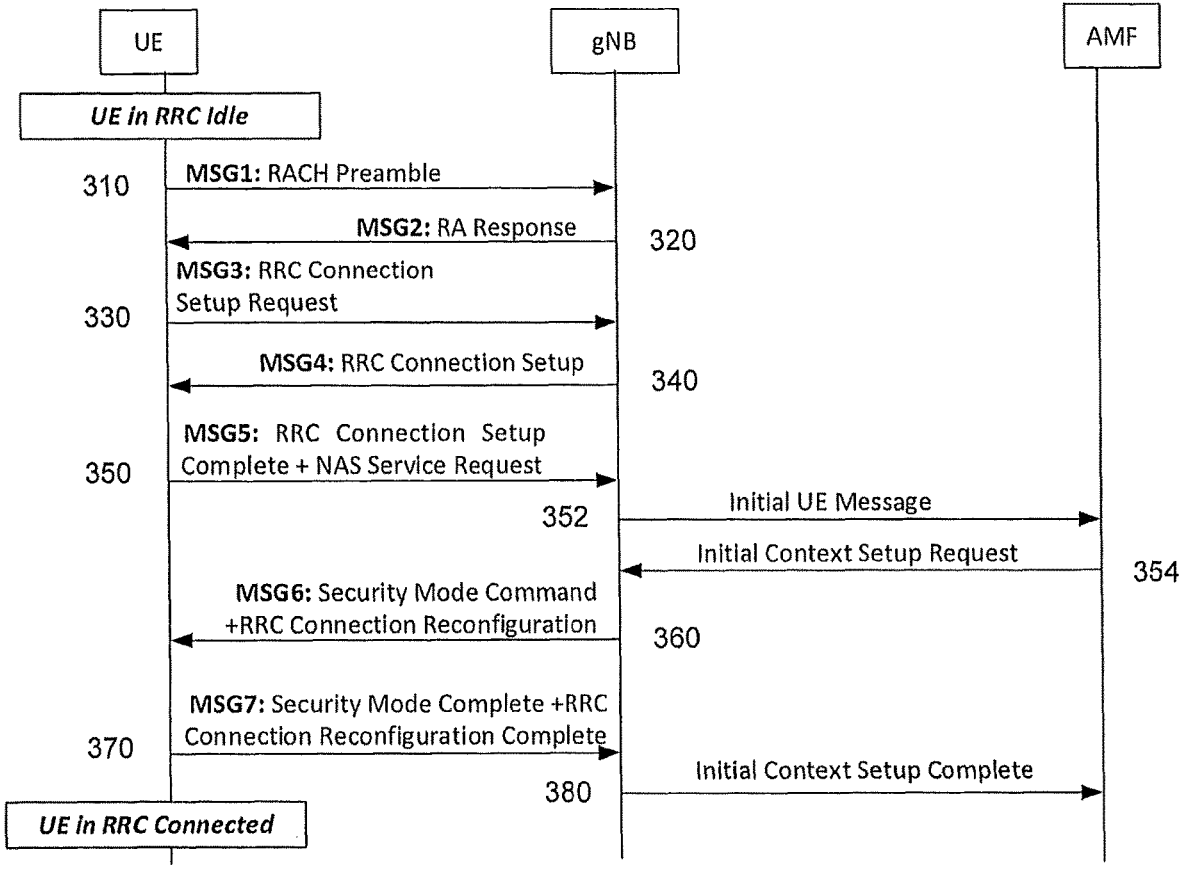
FIG. 3 is a diagram illustrating features as described herein.

Referring now to FIG. 3, illustrated is an example of a (successful) RRC Connection establishment/setup procedure/process. This procedure may be used by a UE in RRC_IDLE state (230) to connect to a gNB (i.e. request establishment of an RRC connection) and transition to RRC_CONNECTED state (210). In the example of FIG. 3, the Msg3 transmission may carry an RRCSetupRequest as well as a UE-Identity and a reason/cause for establishing the connection.

At 310, the UE, which may be in an RRC_IDLE mode, may transmit a Msg1 to the gNB. Msg1 may include a random access channel (RACH) preamble. At 320, the gNB may transmit to the UE a Msg2. Msg2 may include a random access (RA) response. At 330, the UE may transmit a Msg3 to the gNB. Msg3 may include a RRC Connection Setup Request or a RRC Setup Request. In an example embodiment, the Msg3 may also include identification of the UE, which may be a RedCap UE. In an example embodiment, the UE may determine a logical channel identifier that indicates a common control channel and a type of the apparatus. The Msg3 may include a common control channel (CCCH) service data unit (SDU) which may include the RRC Setup Request. The determined LCID may be associated with the MAC subheader of the CCCH SDU. The determined logical channel identifier may be transmitted along with Msg3. At 340, the gNB may transmit a Msg4 to the UE. Msg4 may include an RRC Connection Setup message or a RRC Setup message. At 350, the UE may transmit a Msg5 to the gNB. Msg5 may include an RRC Connection Setup Complete or an RRC Setup Complete message and a non access stratum (NAS) Service request. At 352, the gNB may transmit an initial UE message to the access and mobility management function (AMF) of the network. At 354, the AMF may transmit an initial context setup request to the gNB. At 360, the gNB may transmit a Msg6 to the UE. Msg6 may include a security mode command, and a RRC Connection Reconfiguration (or RRC Reconfiguration) message. At 370, the UE may transmit a Msg7 to the gNB. Msg7 may include a Security Mode Complete indication, and an RRC Connection Reconfiguration Complete message or RRC Reconfiguration complete message. At 380, the gNB may transmit an initial context setup complete message to the AMF. The process of FIG. 3 may result in the UE transitioning to the RRC_CONNECTED state.

The RRCSetupRequest message included in Msg3 may include an indication of an establishment cause and/or an indication of the identity of the UE. In an example, the RRCSetupRequest message may be transmitted from the UE to the network using signaling radio bearer SRB0; with a radio link control service access point (RLC-SAP) in transparent mode (TM); and with common control channel (CCCH) as the logical channel. The RRCSetupRequest message may be as follows:

```
-- ASN1START
-- TAG-RRCSETUPREQUEST-START
RRCSetupRequest ::=        SEQUENCE {
    rrcSetupRequest            RRCSetupRequest-IEs
}
RRCSetupRequest-IEs ::=    SEQUENCE {
    ue-Identity                InitialUE-Identity,
    establishmentCause         EstablishmentCause,
    spare                      BIT STRING (SIZE (1))
}
InitialUE-Identity ::=     CHOICE {
    ng-5G-S-TMSI-Part1         BIT STRING (SIZE (39)),
    randomValue                BIT STRING (SIZE (39))
}
EstablishmentCause ::=     ENUMERATED {
                emergency, highPriorityAccess, mt-Access, mo-Signalling,
                mo-Data, mo-VoiceCall, mo-VideoCall, mo-SMS, mps-
PriorityAccess, mcs-PriorityAccess,
                spare6, spare5, spare4, spare3, spare2, spare1}
-- TAG-RRCSETUPREQUEST-STOP
-- ASN1STOP
``` establishmentCause may provide the establishment cause for the RRCSetupRequest in accordance with the information received from upper layers. The gNB might not be expected to reject an RRCSetupRequest due to an unknown cause value being used by the UE. ue-Identity may comprise a UE identity included to facilitate contention resolution by lower layers.

Figure 4:
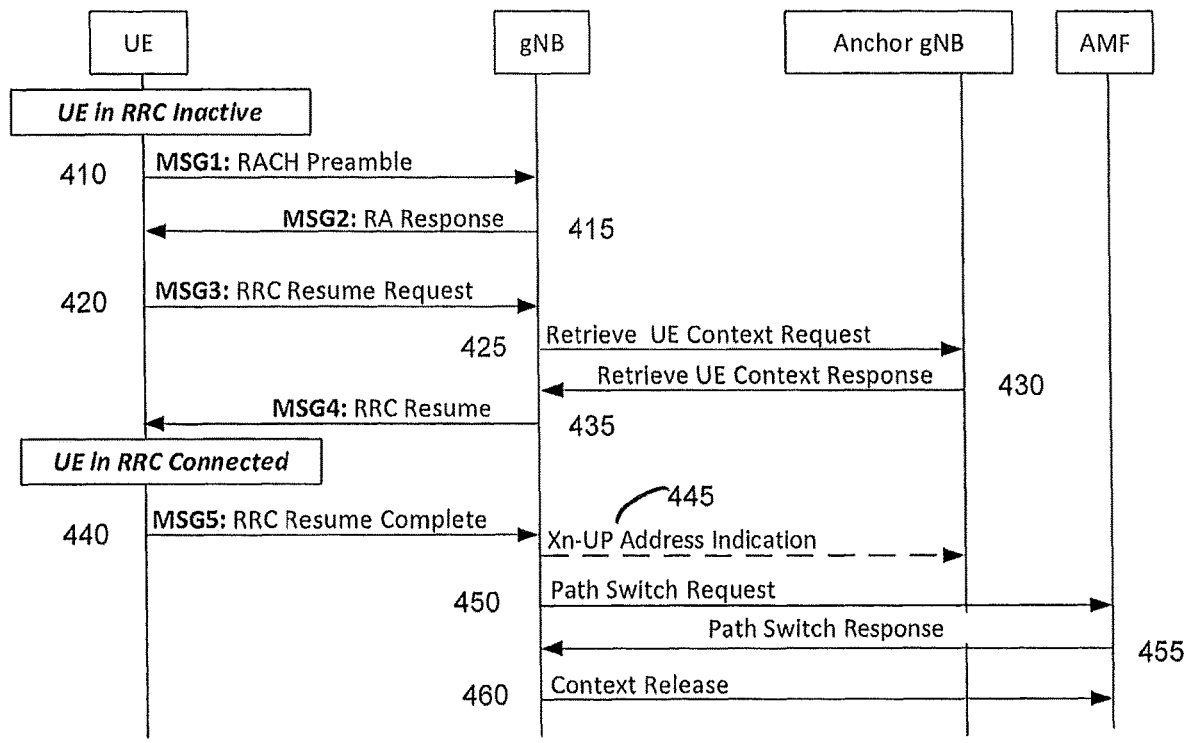
FIG. 4 is a diagram illustrating features as described herein.

Referring now to FIG. 4, illustrated is an example of an RRC Connection Resume procedure in which Msg3 corresponds to RRCResumeRequest(1) and includes, among other information elements (IE), the ResumeIdentity and the resumeCause IEs. This procedure may be used by a UE in RRC_INACTIVE state (220) to connect to a gNB (i.e. request resume of an RRC connection) and transition to RRC_CONNECTED state (210). The RRCResumeRequest (1) message may be used to request the resumption of a suspended RRC connection or to perform an RAN notification area (RNA) update (RNAU).

At 410, the UE, which may be in an RRC_INACTIVE state (220), may transmit a Msg1 to a gNB. Msg1 may include a RACH preamble. At 415, the gNB may transmit a Msg2 to the UE. Msg2 may include a RA response. At 420, the UE may transmit a Msg3 to the gNB. Msg3 may include an RRC Resume Request. Msg3 may also include identification of the UE, which may be a RedCap UE. In an example embodiment, the UE may determine a logical channel identifier that indicates a common control channel and a type of the apparatus. The Msg3 may include a common control channel (CCCH) service data unit (SDU) which may include the RRC Setup Request. The determined LCID may be associated with the MAC subheader of the CCCH SDU. The determined logical channel identifier may be transmitted along with Msg3. At 425, the gNB may transmit a Retrieve UE Context Request to an anchor gNB. At 430, the anchor gNB may transmit a Retrieve UE Context Response to the gNB. At 435, the gNB may transmit Msg4 to the UE. Msg4 may include an RRC Resume message. The UE may transition to an RRC_CONNECTED state (210). At 440, the UE may transmit a Msg5 to the gNB. Msg5 may include an RRC Resume Complete message. At 445, the gNB may transmit an Xn-UP address indication to the anchor gNB. At 450, the gNB may transmit a path switch request to the AMF. At 455, the AMF may transmit a path switch response to the gNB. At 460, the gNB may transmit a context release message to the AMF.

The RRCResumeRequest message included in Msg3 may include an indication of a resume clause, an indication of the identity of the UE, and/or an indication of an authentication token. In an example, the RRCResumeRequest message may be transmitted from the UE to the network using signaling radio bearer SRB0; with RLC-SAP in TM; and with CCCH as the logical channel. The RRCResumeRequest message may be as follows:

```
-- ASN1START
-- TAG-RRCRESUMEREQUEST-START
RRCResumeRequest ::=       SEQUENCE {
    rrcResumeRequest           RRCResumeRequest-IEs
}
RRCResumeRequest-IEs ::=   SEQUENCE {
    resumeIdentity             ShortI-RNTI-Value,
    resumeMAC-I                BIT STRING (SIZE (16)),
    resumeCause                ResumeCause,
    spare                      BIT STRING (SIZE (1))
}
-- TAG-RRCRESUMEREQUEST-STOP
-- ASN1STOP
``` resumeCause may provide the resume cause for the RRC connection resume request as provided by the upper layers or RRC. The network might not be expected to reject an RRCResumeRequest due to an unknown cause value being used by the UE. resumeIdentity may provide the UE identity to facilitate UE context retrieval at the gNB. resumeMAC-I may comprise an authentication token to facilitate UE authentication at gNB. The 16 least significant bits of the MAC-I may be calculated using a specified AS security configuration.

Alternatively, a RRCResumeRequest1 message may be included in Msg3, which may include an indication of a resume cause, an indication of the identity of the UE, and/or an indication of an authentication token. In an example, the RRCResumeRequest1 message may be transmitted from the UE to the network using signaling radio bearer SRB0; with RLC-SAP in TM; and with CCCH1 as the logical channel. The RRCResumeRequest1 message may be as follows:

```
-- ASN1START
-- TAG-RRCRESUMEREQUEST1-START
RRCResumeRequest1 ::=        SEQUENCE {
    rrcResumeRequest1            RRCResumeRequest1-IEs
}
RRCResumeRequest1-IEs ::=    SEQUENCE {
    resumeIdentity               I-RNTI-Value,
    resumeMAC-I                  BIT STRING (SIZE (16)),
    resumeCause                  ResumeCause,
    spare                        BIT STRING (SIZE (1))
}
-- TAG-RRCRESUMEREQUEST1-STOP
-- ASN1STOP
``` resumeCause may provide the resume cause for the RRCResumeRequest1 as provided by the upper layers or RRC. A gNB might not be expected to reject an RRCResumeRequest1 due to unknown cause value being used by the UE. resumeIdentity may provide the UE identity to facilitate UE context retrieval at the gNB. resumeMAC-I may comprise an authentication token to facilitate UE authentication at gNB. The 16 least significant bits of the MAC-I may be calculated using a specified AS security configuration.

Figure 5:
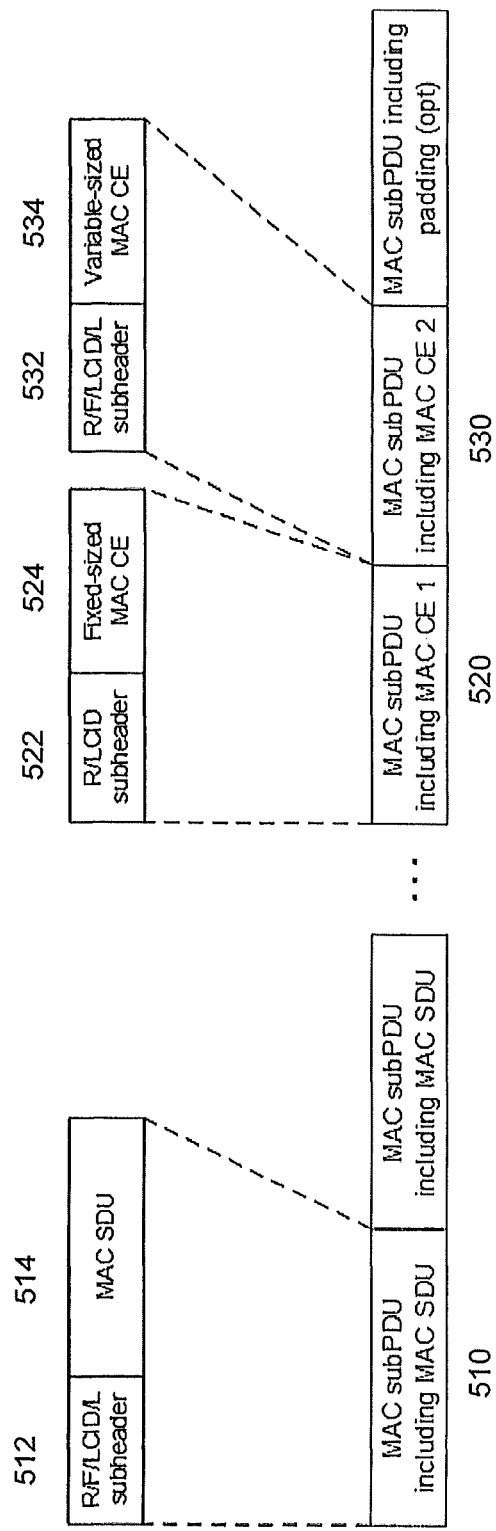
FIG. 5 is a diagram illustrating features as described herein.

Referring now to FIG. 5, illustrated is an example of a 5G NR medium access control (MAC) protocol data unit (PDU) for the uplink (UL) shared channel (SCH), which may carry Msg3. The RRCResumeRequest(1) or RRCSetupRequest which may be carried in MSg3 may be transferred/transmitted/sent using SRB0 on the Common Control Channel (CCCH, CCCH1). The Msg3 may be transmitted on UL-SCH transport channel.

A MAC PDU may consist of one or more MAC sub-PDUs. Each MAC sub-PDU may consist of one of the following fields: a MAC subheader only (including padding); a MAC subheader and a MAC SDU; a MAC subheader and a MAC CE (Control Element); and/or a MAC subheader and padding. Other configurations of a MAC sub-PDU may be possible.

Referring now to FIG. 5, the example MAC PDU comprises at least MAC subPDUs 510, 520, 530, etc. MAC subPDU 510 includes MAC SDU. MAC subPDU 510 comprises R/F/LCID/L fields in a subheader 512 and MAC SDU 514. MAC subPDU 520 includes MAC CE 1. MAC subPDU 520 comprises R/LCID fields in a subheader 522 and fixed-sized MAC CE 524. MAC subPDU 530 includes MAC CE 2. MAC subPDU 530 comprises R/F/LCID/L fields in a subheader 532 and variable-sized MAC CE 534. Other configurations of a MAC PDU may be possible.

Figure 6:
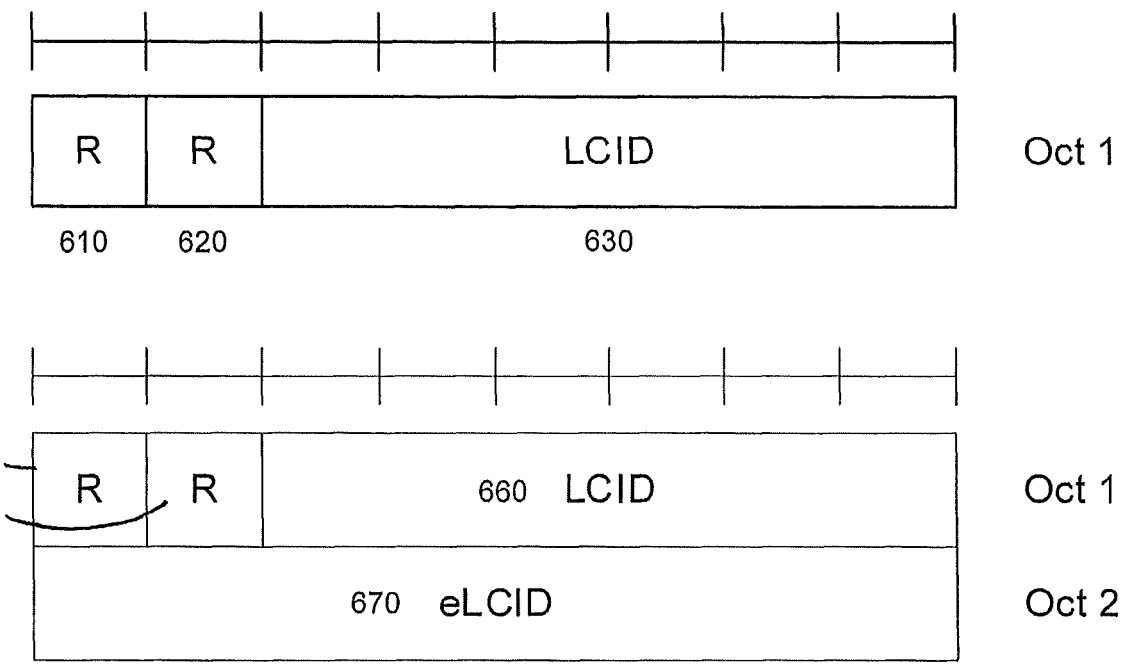
FIG. 6 is a diagram illustrating features as described herein.

MAC SDUs may be of variable sizes. Each MAC subheader may correspond to either a MAC SDU, a MAC CE, or padding. A MAC subheader for fixed sized MAC CE, padding, and a MAC SDU containing UL CCCH (e.g. 520) may consist of the two header fields R/LCID/(eLCID). Referring now to FIG. 6, illustrated are examples of R/LCID/(eLCID) MAC subheader fields for MAC SDU containing CCCH. The MAC subheader may comprise a reserved bit R, which may be set to 0 (e.g. 610, 620, 640, 650). The MAC subheader may also comprise an LCID field (e.g. 630, 660). The Logical Channel ID (LCID) field may identify the logical channel instance of the corresponding MAC SDU, or the type of the corresponding MAC CE, or padding, as described in Table 2 below, for the UL-SCH.

There may be one LCID field per MAC subheader. The LCID field size may be/comprise 6 bits. In an example, if the LCID field is set to Codepoint/Index 34 (i.e. has a value of 100010) (see Table 2 below), one additional octet comprising 8 bits may be present in the MAC subheader, containing the eLCID field (670), and may follow the octet containing LCID field (660). If the LCID field is set to Codepoint/Index 33 (i.e. has a value of 100001) (see Table 2 below), two additional octets may be present in the MAC subheader, for/containing the eLCID field(s), and these two additional octets may follow the octet containing the LCID field (not shown in FIG. 6).

The MAC subheader may comprise an eLCID field. The extended Logical Channel ID (eLCID) field may identify the logical channel instance of the corresponding MAC SDU or the type of the corresponding MAC CE. The size of the eLCID field may be either 8 bits or 16 bits. It may be noted that the eLCID space using two-octet eLCID and the relevant MAC subheader format may be used, only when configured, on the NR backhaul links between integrated access and backhaul (IAB) nodes or between an IAB node and an LAB Donor.

The LCID field may be unique per MAC subheader and may indicate the content of the transmission, e.g. when transmitting the RRCSetupRequest or RRCResumeRequest (1), the CCCH(1) is used, for 64 bits or 48 bits corresponding to Codepoint/Index 0 or 52, respectively.

Table 2 demonstrates the values of the LCID field for UL-SCH (i.e. MAC LCID field structure):

TABLE 2

| Codepoint/Index | LCID values |
| --- | --- |
| 0 | CCCH of size 64 bits (referred to as "CCCH1" in TS 38.331 [5]) |
| 1-32 | Identity of the logical channel |
| 33 | Extended logical channel ID field (two-octet eLCID field) |
| 34 | Extended logical channel ID field (one-octet eLCID field) |
| 35-44 | Reserved |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet $C_i$) |
| 51 | Truncated BFR (one octet $C_i$) |
| 52 | CCCH of size 48 bits (referred to as "CCCH" in TS 38.331 [5]) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

In Table 2, index 0 indicates a CCCH of size 64 bits, which may be referred to as CCCH1. If a MAC PDU comprises a MAC subPDU comprising an LCID subheader field with this value, it may be understood that CCCH1 may be used to transmit RRCSetupRequest or RRCResumeRequest(1). If a MAC PDU comprises a MAC subPDU comprising an LCID subheader field with a value of 52, it may be understood that CCCH, which a size of 48 bits may be used to transmit RRCSetupRequest or RRCResumeRequest. In other words, a CCCH SDU may comprise a RRC connection request such as RRCSetupRequest or RRCResumeRequest.

In an example embodiment, a UE may be identified via Msg3 transmission using the existing content of the RRC messages. In an example embodiment, additional logical channel identifier (LCID) value(s) may be defined that correspond to one or more CCCH(s) for RedCap UEs. For example, one LCID value may be defined per CCCH SDU size (e.g. CCCH SDU sizes of 48 or 64 bits). In other words, in an example embodiment, a logical channel identifier may indicate a CCCH SDU size. The size may be a predefined size, such as 48 bits or 64 bits. In an example embodiment, this defined LCID value may use the reserved values of the LCID field in a MAC subheader for the corresponding CCCH SDU.

In an example embodiment, a gNB receiving a MAC PDU carrying Msg3 (or MsgA) from a UE may understand/determine the UE to be a UE of a certain type, such as a RedCap UE or a type of RedCap UE, if a MAC subPDU of the MAC PDU comprises an LCID subheader field carrying an LCID value configured to indicate a type of UE, such as a RedCap UE or a type of RedCap UE. Additionally, the LCID value may indicate a CCCH SDU size. The LCID value may be identified by a codepoint or an index, for example a defined codepoint or index as in Table 3 below. If the MAC PDU does not comprise a MAC subPDU of the MAC PDU comprising an LCID subheader field carrying an LCID value configured to indicate a CCCH SDU size associated with a (type of) RedCap UE, the gNB might not consider the UE to be a RedCap UE.

In an example embodiment, a UE may determine a logical channel identifier that indicates a CCCH and a type of the UE. The logical channel identifier may be transmitted via an LCID field.

In an example embodiment, a UE may determine to transmit a CCCH SDU, and determine a logical channel identifier to transmit via the MAC subPDU based on CCCH SDU to be transmitted. The logical channel identifier may be transmitted via an LCID field.

In the example of Table 2, Codepoint/Index 35-44 are reserved. In an example embodiment, two Codepoint/Index within the range of [35-44] may be used for RedCap UE identification, which may result in LCID Values for UL-SCH, as illustrated in the example of Table 3 below.

In an example embodiment, a RedCap UE may be identified based on the LCID value used in a MAC PDU of Msg3.

In an example embodiment, the LCID for the CCCH and RedCap UE identification may be defined only for a single CCCH SDU size, e.g., only for a size of 48 or 64 bits.

In an example embodiment, more LCID values may be defined to distinguish further different RedCap UE types e.g. RedCap UE type 1, RedCap UE type 2, RedCap UE type 3, etc. For example, based on the example of Table 3, a Codepoint/Index of 42 or any other codepoint/index may be additionally defined to indicate a specific RedCap UE type.

Table 3 demonstrates example values of/for the LCID field for UL-SCH (i.e. MAC LCID field structure), including new values for RedCap UE identification:

TABLE 3

| Codepoint/Index | LCID values |
|---|---|
| 0 | CCCH of size 64 bits (referred to as "CCCH1" in TS 38.331 5) |
| 1-32 | Identity of the logical channel |
| 33 | Extended logical channel ID field (two-octet eLCID field) |
| 34 | Extended logical channel ID field (one-octet eLCID field) |
| 35-42 | Reserved |
| 43 | CCCH of size 64 bits for REDCAP UEs (referred to as "CCCH1" in TS 38.331 5) |
| 44 | CCCH of size 48 bits for REDCAP UEs (referred to as "CCCH" in TS 38.331 5) |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet Ci) |
| 51 | Truncated BFR (one octet Ci) |
| 52 | CCCH of size 48 bits (referred to as "CCCH" in TS 38.331 5) |
| 53 | Recommended bit rate query |
| 54 | Multiple Entry PHR (four octets CO |
| 55 | Configured Grant Confirmation |
| 56 | Multiple Entry PHR (one octet CO |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

In contrast to the example of Table 2, in which Codepoint/Index 35-44 may be reserved, in the example of Table 3 Codepoint/Index 35-42 may be reserved. In the example of Table 3, Codepoint/Index 43 may be configured to indicate a CCCH of size 64 bits for RedCap UEs, which may also be referred to as CCCH1. In other words, LCID 43 may indicate a CCCH (CCCH(1) of size 64 bits) and a type of a UE (RedCap UE). In the example of Table 3, Codepoint/Index 44 may be configured to indicate a CCCH of size 48 bits for RedCap UEs, which may also be referred to as CCCH. In other words, LCID 44 may indicate a CCCH (CCCH of size 48 bits) and a type of a UE (RedCap UE). In another example, additional reserved Codepoint/Index may be repurposed/defined to distinguish additional different RedCap UE types, for example in the range of 35-42. In some examples, the different RedCap UE types may comprise 1 Rx capable RedCap UE and 2 Rx capable RedCap UE where the RedCap UE would have either 1 or 2 receiver chains, respectively.

In an example based on Table 3, a Msg3 transmitted by a RedCap UE may comprise, for example, an LCID subheader field of 6 bits. The LCID field of the subheader may comprise the value 101011 (i.e. 43) and/or 101100 (i.e. 44). Different or additional LCID values may be defined to indicate, for example one or more RedCap UE types. Values defined to indicate RedCap UEs might not be considered reserved LCID field values. Because the MAC PDU configured of Msg3 may comprise an LCID value configured to indicate a CCCH SDU size and a UE type (e.g. RedCap), a receiving gNB, base station, or another network node may be able to identify the transmitting UE as a UE of a certain type (e.g. RedCap) transmitting via a certain CCCH.

There may be only one LCID field possible per MAC subheader. In an example embodiment, it may be determined/ensured that no conflicts are possible, for example by determining whether the LCID field intended to use for RedCap UE identification is already utilized/intended for some other use. In an example embodiment, a conflict in the intended use for an LCID field may be resolved/prevented by indicating RedCap UE together with common control channel (CCCH) length. In the example of Table 3, an LCID value may be associated with a RedCap UE and a CCCH size (e.g. at Codepoint/Index 43), while another LCID value may be associated with a RedCap UE and a (different or same) CCCH size (e.g. at Codepoint/Index 44). In an example, these LCID may be associated with the same or different types of RedCap UE.

Other LCID values may be indicated via Msg3 that might not be specific to RedCap UEs. For example, a UE which may be in an RRC_CONNECTED may indicate a cell radio network temporary identifier (C-RNTI) e.g. at Codepoint/Index 58. If MAC group C-RNTI MAC CE (LCID=58) is transmitted in the Msg3, inclusion of an LCID value associated with RedCap UE identification may be unnecessary, as the UE has already been identified as a RedCap UE.

In an example embodiment, a message transmitted by a UE to a gNB that includes an indication of whether the UE is a RedCap UE may comprise, at least, a CCCH SDU comprising a RRC connection request. In other words, the message may include a CCCH SDU as well as other content, such as a subheader, MAC CE, data, etc. (see e.g. FIG. 5). The message may be, for example a MAC PDU. The UE may be in one of an RRC_IDLE or RRC_INACTIVE state when transmitting such a message. The indication of whether the UE is a RedCap UE may be an indication that the UE is one of a plurality of different RedCap UE types.

In an example embodiment, a message transmitted by a UE to a gNB that includes an indication of a type of the UE may also include an indication of a CCCH. The indication of the CCCH may be an indication of one of a plurality of different CCCH (e.g. CCCH, CCCH1, etc.).

In an example embodiment, a gNB (or other base station) receiving a message from a UE including an indication of a type of the UE and/or an indication of a CCCH may determine whether to restrict access of the UE based on a determination that the UE is a RedCap UE or a type of RedCap UE. Additionally or alternatively, the gNB may determine whether to schedule the UE in connection establishment/resume phase (e.g. with respect to bandwidth capability). For example, if the gNB determines that the UE is a RedCap UE or a type of RedCap UE, the gNB may decide to schedule the UE for transition to a CM-CONNECTED state (see FIG. 2) using a bandwidth the RedCap UE or type of RedCap UE is capable of using according to a specification. Additionally or alternatively, the gNB may determine a feature set (e.g. modulation and coding scheme (MCS) based on a determination that the UE is a RedCap UE or a type of RedCap UE.

A technical effect of example embodiments of the present disclosure, such as enablement and/or use of new LCID values that may be specific for RedCap UEs/other types of UE, may be to enable the NW to identify a RedCap UE from a legacy NR UE without including any additional bits in MSG3 and/or without using the only spare bit in MSG3 to identify a RedCap UE.

A technical effect of example embodiments of the present disclosure may be that identification of RedCap UE may be transparent to legacy UEs.

A technical effect of example embodiments of the present disclosure may be enabling identification of RedCap UE in any RRC state, including RRC_IDLE or RRC_INACTIVE.

A technical effect of example embodiments of the present disclosure may be enabling identification of RedCap UE for the case of initial attach when no temporary identification of the UE has been assigned by the NW.

FIG. 7 illustrates the potential steps of an example method 700. The example method 700 may include: determining a logical channel identifier, wherein the logical channel identifier indicates a common control channel and indicates a type of the user equipment, 710; and transmitting a message comprising the determined logical channel identifier, 720.

FIG. 8 illustrates the potential steps of an example method 800. The example method 800 may include: receiving, from a user equipment, a message comprising a logical channel identifier, wherein the logical channel identifier indicates a common control channel and indicates a type of the user equipment, 810; and determining whether the user equipment comprises a reduced capability user equipment based on the logical channel identifier, 820.

In accordance with one aspect, an example method may be provided comprising: determining, at a user equipment, a logical channel identifier, wherein the logical channel identifier may indicate a common control channel and indicates a type of the user equipment; and transmitting a message comprising the determined logical channel identifier.

The indicated type of the user equipment may comprise a reduced capability type of user equipment.

The determining of the logical channel identifier may further comprise: determining that a common control channel service data unit is to be transmitted; and determining the logical channel identifier based, at least partially, on the determination that the common control channel service data unit is to be transmitted.

The logical channel identifier may indicate a common control channel service data unit size.

The common control channel service data unit size may comprise a predefined size, wherein the predefined size may comprise at least one of: 48 bits or 64 bits.

The logical channel identifier may comprise a value associated with reduced capability user equipment.

The logical channel identifier may be identified by a codepoint or an index.

The message may include at least a common control channel service data unit, wherein the common control channel service data unit may include at least a radio resource control connection request.

The radio resource control connection request may comprise at least one of a radio resource control setup request or a radio resource control resume request.

The user equipment may be in at least one of a radio resource control inactive state or a radio resource control idle state.

The message may comprise a random access procedure message 3 or a random access procedure message A.

The logical channel identifier may indicate that the user equipment comprises a reduced capability user equipment of one or a plurality of types.

The logical channel identifier may comprise one of a plurality of logical channel identifiers that are configured to indicate a user equipment type.

The logical channel identifier may comprise one of a plurality of logical channel identifiers, wherein a first logical channel identifier of the plurality of logical channel identifiers may indicate a first common control channel service data unit and a second logical channel identifier of the plurality of logical channel identifiers may indicate a second common control channel service data unit, wherein a size of the first common control channel service data unit and a size of the second common control channel service data unit may be different.

In accordance with one example embodiment, an apparatus may comprise: at least one processor; and at least one memory including computer program code; the at least one memory and the computer program code configured to, with the at least one processor, cause the apparatus to: determine a logical channel identifier, wherein the logical channel identifier may indicate a common control channel and indicates a type of the apparatus; and transmit a message comprising the determined logical channel identifier.

The indicated type of the apparatus may comprise a reduced capability type of apparatus.

The determining the logical channel identifier may comprise the example apparatus being further configured to: determine that a common control channel service data unit is to be transmitted; and determine the logical channel identifier based, at least partially, on the determination that the common control channel service data unit is to be transmitted.

The logical channel identifier may indicate a common control channel service data unit size.

The common control channel service data unit size may comprise a predefined size, wherein the predefined size may comprise at least one of: 48 bits or 64 bits.

The logical channel identifier may comprise a value associated with reduced capability user equipment.

The logical channel identifier may be identified by a codepoint or an index.

The message may include at least a common control channel service data unit, wherein the common control channel service data unit may include at least a radio resource control connection request.

The radio resource control connection request may comprise at least one of a radio resource control setup request or a radio resource control resume request.

The apparatus may be in at least one of a radio resource control inactive state or a radio resource control idle state.

The message may comprise a random access procedure message 3 or a random access procedure message A.

The logical channel identifier may indicate that the apparatus comprises a reduced capability apparatus of one or a plurality of types.

The logical channel identifier may comprise one of a plurality of logical channel identifiers that are configured to indicate an apparatus type.

The logical channel identifier may comprise one of a plurality of logical channel identifiers, wherein a first logical channel identifier of the plurality of logical channel identifiers may indicate a first common control channel service data unit and a second logical channel identifier of the plurality of logical channel identifiers may indicate a second common control channel service data unit, wherein a size of the first common control channel service data unit and a size of the second common control channel service data unit are different.

In accordance with one example embodiment, an apparatus may comprise: circuitry configured to perform: determine a logical channel identifier, wherein the logical channel identifier may indicate a common control channel and indicates a type of the apparatus; and transmit a message comprising the determined logical channel identifier.

In accordance with one example embodiment, an apparatus may comprise: processing circuitry; memory circuitry including computer program code, the memory circuitry and the computer program code configured to, with the processing circuitry, enable the apparatus to: determine a logical channel identifier, wherein the logical channel identifier may indicate a common control channel and indicates a type of the apparatus; and transmit a message comprising the determined logical channel identifier.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: determining a logical channel identifier, wherein the logical channel identifier may indicate a common control channel and indicates a type of the apparatus; and transmitting a message comprising the determined logical channel identifier.

The indicated type of the apparatus may comprise a reduced capability type of apparatus.

The means configured to perform determining of the logical channel identifier may be further configured to perform: determining that a common control channel service data unit is to be transmitted; and determining the logical channel identifier based, at least partially, on the determination that the common control channel service data unit is to be transmitted.

The logical channel identifier may indicate a common control channel service data unit size.

The common control channel service data unit size may comprise a predefined size, wherein the predefined size may comprise at least one of: 48 bits or 64 bits.

The logical channel identifier may comprise a value associated with reduced capability user equipment.

The logical channel identifier may be identified by a codepoint or an index.

The message may include at least a common control channel service data unit, wherein the common control channel service data unit may include at least a radio resource control connection request.

The radio resource control connection request may comprise at least one of a radio resource control setup request or a radio resource control resume request.

The apparatus may be in at least one of a radio resource control inactive state or a radio resource control idle state.

The message may comprise a random access procedure message 3 or a random access procedure message A.

The logical channel identifier may indicate that the apparatus comprises a reduced capability apparatus of one or a plurality of types.

The logical channel identifier may comprise one of a plurality of logical channel identifiers that are configured to indicate an apparatus type.

The logical channel identifier may comprise one of a plurality of logical channel identifiers, wherein a first logical channel identifier of the plurality of logical channel identifiers may indicate a first common control channel service data unit and a second logical channel identifier of the plurality of logical channel identifiers may indicate a second common control channel service data unit, wherein a size of the first common control channel service data unit and a size of the second common control channel service data unit may be different.

In accordance with one example embodiment, a non-transitory computer-readable medium comprising program instructions stored thereon which, when executed with at least one processor, cause the at least one processor to determine a logical channel identifier, wherein the logical channel identifier may indicate a common control channel and indicates a type of a user equipment; and transmit a message comprising the determined logical channel identifier.

The indicated type of the user equipment may comprise a reduced capability type of user equipment.

Determining the logical channel identifier may comprise the example non-transitory computer-readable medium being further configured to: determine that a common control channel service data unit is to be transmitted; and determine the logical channel identifier based, at least partially, on the determination that the common control channel service data unit is to be transmitted.

The logical channel identifier may indicate a common control channel service data unit size.

The common control channel service data unit size may comprise a predefined size, wherein the predefined size may comprise at least one of: 48 bits or 64 bits.

The logical channel identifier may comprise a value associated with reduced capability user equipment.

The logical channel identifier may be identified by a codepoint or an index.

The message may include at least a common control channel service data unit, wherein the common control channel service data unit may include at least a radio resource control connection request.

The radio resource control connection request may comprise at least one of a radio resource control setup request or a radio resource control resume request.

The user equipment may be in at least one of a radio resource control inactive state or a radio resource control idle state.

The message may comprise a random access procedure message 3 or a random access procedure message A.

The logical channel identifier may indicate that the user equipment comprises a reduced capability user equipment of one or a plurality of types.

The logical channel identifier may comprise one of a plurality of logical channel identifiers that are configured to indicate a user equipment type.

The logical channel identifier may comprise one of a plurality of logical channel identifiers, wherein a first logical channel identifier of the plurality of logical channel identifiers may indicate a first common control channel service data unit and a second logical channel identifier of the plurality of logical channel identifiers may indicate a second common control channel service data unit, wherein a size of the first common control channel service data unit and a size of the second common control channel service data unit may be different.

In accordance with another example embodiment, a non-transitory program storage device readable by a machine may be provided, tangibly embodying a program of instructions executable by the machine for performing operations, the operations comprising: determining a logical channel identifier, wherein the logical channel identifier may indicate a common control channel and indicates a type of a user equipment; and transmitting a message comprising the determined logical channel identifier.

In accordance with one aspect, an example method may be provided comprising: receiving, from a user equipment, a message comprising a logical channel identifier, wherein the logical channel identifier may indicate a common control channel and may indicate a type of the user equipment; and determining whether the user equipment comprises a reduced capability user equipment based on the logical channel identifier.

The indicated type of the user equipment may comprise a reduced capability type of user equipment.

The logical channel identifier may indicate a common control channel service data unit size.

The common control channel service data unit size may comprise a predefined size, wherein the predefined size may comprise at least one of: 48 bits or 64 bits.

The logical channel identifier may comprise a value associated with reduced capability user equipment.

The logical channel identifier may be identified by a codepoint or an index.

The message may include at least a common control channel service data unit, wherein the common control channel service data unit may include at least a radio resource control connection request.

The radio resource control connection request may comprise at least one of a radio resource control setup request or a radio resource control resume request.

The user equipment may be in at least one of a radio resource control inactive state or a radio resource control idle state.

The message may comprise a random access procedure message 3 or a random access procedure message A.

The logical channel identifier may indicate that the user equipment comprises a reduced capability user equipment of one or a plurality of types.

The logical channel identifier may comprise one of a plurality of logical channel identifiers that are configured to indicate a user equipment type.

The logical channel identifier may comprise one of a plurality of logical channel identifiers, wherein a first logical channel identifier of the plurality of logical channel identifiers may indicate a first common control channel service data unit and a second logical channel identifier of the plurality of logical channel identifiers may indicate a second common control channel service data unit, wherein a size of the first common control channel service data unit and a size of the second common control channel service data unit may be different.

The example method may further comprise at least one of: determining whether to restrict access of the user equipment to a network, determining whether to schedule the user equipment for connection establishment, determining whether to schedule the user equipment for connection resume, determining a feature set the user equipment is capable of using, or determining a modulation and coding scheme the user equipment is capable of using, based on the determination that the user equipment comprises a reduced capability user equipment.

The example method may further comprise: transmitting, to the user equipment, a response to the received message, wherein the transmitted response may be based on the determination that the user equipment comprises the reduced capability user equipment.

In accordance with one example embodiment, an apparatus may comprise: at least one processor; and at least one memory including computer program code; the at least one memory and the computer program code configured to, with the at least one processor, cause the apparatus to: receive, from a user equipment, a message comprising a logical channel identifier, wherein the logical channel identifier may indicate a common control channel and may indicate a type of the user equipment; and determine whether the user equipment comprises a reduced capability user equipment based on the logical channel identifier.

The indicated type of the user equipment may comprise a reduced capability type of user equipment.

The logical channel identifier may indicate a common control channel service data unit size.

The common control channel service data unit size may comprise a predefined size, wherein the predefined size may comprise at least one of: 48 bits or 64 bits.

The logical channel identifier may comprise a value associated with reduced capability user equipment.

The logical channel identifier may be identified by a codepoint or an index.

The message may include at least a common control channel service data unit, wherein the common control channel service data unit may include at least a radio resource control connection request.

The radio resource control connection request may comprise at least one of a radio resource control setup request or a radio resource control resume request.

The user equipment may be in at least one of a radio resource control inactive state or a radio resource control idle state.

The message may comprise a random access procedure message 3 or a random access procedure message A.

The logical channel identifier may indicate that the user equipment comprises a reduced capability user equipment of one or a plurality of types.

The logical channel identifier may comprise one of a plurality of logical channel identifiers that are configured to indicate a user equipment type.

The logical channel identifier may comprise one of a plurality of logical channel identifiers, wherein a first logical channel identifier of the plurality of logical channel identifiers may indicate a first common control channel service data unit and a second logical channel identifier of the plurality of logical channel identifiers may indicate a second common control channel service data unit, wherein a size of the first common control channel service data unit and a size of the second common control channel service data unit may be different.

The example apparatus may be further configured to at least one of: determine whether to restrict access of the user equipment to a network, determine whether to schedule the user equipment for connection establishment, determine whether to schedule the user equipment for connection resume, determine a feature set the user equipment is capable of using, or determine a modulation and coding scheme the user equipment is capable of using, based on the determination that the user equipment comprises a reduced capability user equipment.

The example apparatus may be further configured to: transmit, to the user equipment, a response to the received message, wherein the transmitted response may be based on the determination that the user equipment comprises the reduced capability user equipment.

In accordance with one example embodiment, an apparatus may comprise: circuitry configured to perform: receive, from a user equipment, a message comprising a logical channel identifier, wherein the logical channel identifier may indicate a common control channel and may indicate a type of the user equipment; and determine whether the user equipment comprises a reduced capability user equipment based on the logical channel identifier.

In accordance with one example embodiment, an apparatus may comprise: processing circuitry; memory circuitry including computer program code, the memory circuitry and the computer program code configured to, with the processing circuitry, enable the apparatus to: receive, from a user equipment, a message comprising a logical channel identifier, wherein the logical channel identifier may indicate a common control channel and may indicate a type of the user equipment; and determine whether the user equipment comprises a reduced capability user equipment based on the logical channel identifier.

In accordance with one example embodiment, an apparatus may comprise means for performing: receiving, from a user equipment, a message comprising a logical channel identifier, wherein the logical channel identifier may indicate a common control channel and may indicate a type of the user equipment; and determining whether the user equipment comprises a reduced capability user equipment based on the logical channel identifier.

The indicated type of the user equipment may comprise a reduced capability type of user equipment.

The logical channel identifier may indicate a common control channel service data unit size.

The common control channel service data unit size may comprise a predefined size, wherein the predefined size may comprise at least one of: 48 bits or 64 bits.

The logical channel identifier may comprise a value associated with reduced capability user equipment.

The logical channel identifier may be identified by a codepoint or an index.

The message may include at least a common control channel service data unit, wherein the common control channel service data unit may include at least a radio resource control connection request.

The radio resource control connection request may comprise at least one of a radio resource control setup request or a radio resource control resume request.

The user equipment may be in at least one of a radio resource control inactive state or a radio resource control idle state.

The message may comprise a random access procedure message 3 or a random access procedure message A.

The logical channel identifier may indicate that the user equipment comprises a reduced capability user equipment of one or a plurality of types.

The logical channel identifier may comprise one of a plurality of logical channel identifiers that are configured to indicate a user equipment type.

The logical channel identifier may comprise one of a plurality of logical channel identifiers, wherein a first logical channel identifier of the plurality of logical channel identifiers may indicate a first common control channel service data unit and a second logical channel identifier of the plurality of logical channel identifiers may indicate a second common control channel service data unit, wherein a size of the first common control channel service data unit and a size of the second common control channel service data unit may be different.

The means may be further configured to perform at least one of: determining whether to restrict access of the user equipment to a network, determining whether to schedule the user equipment for connection establishment, determining whether to schedule the user equipment for connection resume, determining a feature set the user equipment is capable of using, or determining a modulation and coding scheme the user equipment is capable of using, based on the determination that the user equipment comprises a reduced capability user equipment.

The means may be further configured to perform: transmitting, to the user equipment, a response to the received message, wherein the transmitted response may be based on the determination that the user equipment comprises the reduced capability user equipment.

In accordance with one example embodiment, a non-transitory computer-readable medium comprising program instructions stored thereon which, when executed with at least one processor, cause the at least one processor to: receive, from a user equipment, a message comprising a logical channel identifier, wherein the logical channel identifier may indicate a common control channel and may indicate a type of the user equipment; and determine whether the user equipment comprises a reduced capability user equipment based on the logical channel identifier.

The indicated type of the user equipment may comprise a reduced capability type of user equipment.

The logical channel identifier may indicate a common control channel service data unit size.

The common control channel service data unit size may comprise a predefined size, wherein the predefined size may comprise at least one of: 48 bits or 64 bits.

The logical channel identifier may comprise a value associated with reduced capability user equipment.

The logical channel identifier may be identified by a codepoint or an index.

The message may include at least a common control channel service data unit, wherein the common control channel service data unit may include at least a radio resource control connection request.

The radio resource control connection request may comprise at least one of a radio resource control setup request or a radio resource control resume request.

The user equipment may be in at least one of a radio resource control inactive state or a radio resource control idle state.

The message may comprise a random access procedure message 3 or a random access procedure message A.

The logical channel identifier may indicate that the user equipment comprises a reduced capability user equipment of one or a plurality of types.

The logical channel identifier may comprise one of a plurality of logical channel identifiers that are configured to indicate a user equipment type.

The logical channel identifier may comprise one of a plurality of logical channel identifiers, wherein a first logical channel identifier of the plurality of logical channel identifiers may indicate a first common control channel service data unit and a second logical channel identifier of the plurality of logical channel identifiers may indicate a second common control channel service data unit, wherein a size of the first common control channel service data unit and a size of the second common control channel service data unit may be different.

The example non-transitory computer-readable medium may be further configured to at least one of: determine whether to restrict access of the user equipment to a network, determine whether to schedule the user equipment for connection establishment, determine whether to schedule the user equipment for connection resume, determine a feature set the user equipment is capable of using, or determine a modulation and coding scheme the user equipment is capable of using, based on the determination that the user equipment comprises a reduced capability user equipment.

The example non-transitory computer-readable medium may be further configured to: transmit, to the user equipment, a response to the received message, wherein the transmitted response may be based on the determination that the user equipment comprises the reduced capability user equipment.

In accordance with another example embodiment, a non-transitory program storage device readable by a machine may be provided, tangibly embodying a program of instructions executable by the machine for performing operations, the operations comprising: receive, from a user equipment, a message comprising a logical channel identifier, wherein the logical channel identifier may indicate a common control channel and may indicate a type of the user equipment; and determine whether the user equipment comprises a reduced capability user equipment based on the logical channel identifier.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
at least one processor; and
at least one non-transitory memory and computer program code, wherein the at least one memory and the computer program code are configured to, with the at least one processor, cause the apparatus to:
determine a logical channel identifier, wherein the logical channel identifier indicates a common control channel and indicates a type of the apparatus; and
transmit a message comprising the determined logical channel identifier,
wherein the logical channel identifier comprises one of a plurality of logical channel identifiers that are configured to indicate an apparatus type,
wherein a first logical channel identifier of the plurality of logical channel identifiers indicates a first common control channel service data unit, and a second logical channel identifier of the plurality of logical channel identifiers indicates a second common control channel service data unit,
wherein a size of the first common control channel service data unit and a size of the second common control channel service data unit are different.

2. The apparatus of claim 1, wherein the indicated type of the apparatus comprises a reduced capability type of apparatus.

3. The apparatus of claim 1, wherein the determining the logical channel identifier comprises the apparatus being further configured to:
   determine that a common control channel service data unit is to be transmitted; and
   determine the logical channel identifier based, at least partially, on the determination that the common control channel service data unit is to be transmitted.

4. The apparatus of claim 1, wherein the logical channel identifier indicates a common control channel service data unit size.

5. The apparatus of claim 4, wherein the common control channel service data unit size comprises a predefined size, wherein the predefined size comprises at least one of: 48 bits or 64 bits.

6. The apparatus of claim 1, wherein the logical channel identifier comprises a value associated with reduced capability user equipment.

7. The apparatus of claim 1, wherein the logical channel identifier is identified by a codepoint or an index.

8. The apparatus of claim 1, wherein the message includes at least a common control channel service data unit, wherein the common control channel service data unit includes at least a radio resource control connection request.

9. The apparatus of claim 8, wherein the radio resource control connection request comprises at least one of a radio resource control setup request or a radio resource control resume request.

10. The apparatus of claim 1, wherein the apparatus is in at least one of a radio resource control inactive state or a radio resource control idle state.

11. The apparatus of claim 1, wherein the message comprises a random access procedure message 3 or a random access procedure message A.

12. The apparatus of claim 1, wherein the logical channel identifier indicates that the apparatus comprises a reduced capability apparatus of one or a plurality of types.

13. A method comprising:
   determining, at a user equipment, a logical channel identifier, wherein the logical channel identifier indicates a common control channel and indicates a type of the user equipment; and
   transmitting a message comprising the determined logical channel identifier,
   wherein the logical channel identifier comprises one of a plurality of logical channel identifiers that are configured to indicate a user equipment type,
   wherein a first logical channel identifier of the plurality of logical channel identifiers indicates a first common control channel service data unit, and a second logical channel identifier of the plurality of logical channel identifiers indicates a second common control channel service data unit,
   wherein a size of the first common control channel service data unit and a size of the second common control channel service data unit are different.

14. The method of claim 13, wherein the indicated type of the user equipment comprises a reduced capability type of user equipment.

15. The method of claim 13, wherein the determining the logical channel identifier comprises:
   determining that a common control channel service data unit is to be transmitted; and
   determining the logical channel identifier based, at least partially, on the determination that the common control channel service data unit is to be transmitted.

16. An apparatus comprising:
   at least one processor; and
   at least one non-transitory memory and computer program code, wherein the at least one memory and the computer program code are configured to, with the at least one processor, cause the apparatus to:
      receive, from a user equipment, a message comprising a logical channel identifier, wherein the logical channel identifier indicates a common control channel and indicates a type of the user equipment; and
      determine whether the user equipment comprises a reduced capability user equipment based on the logical channel identifier,
   wherein the logical channel identifier comprises one of a plurality of logical channel identifiers that are configured to indicate a user equipment type,
   wherein a first logical channel identifier of the plurality of logical channel identifiers indicates a first common control channel service data unit, and a second logical channel identifier of the plurality of logical channel identifiers indicates a second common control channel service data unit,
   wherein a size of the first common control channel service data unit and a size of the second common control channel service data unit are different.

17. The apparatus of claim 16, wherein the indicated type of the user equipment comprises a reduced capability type of user equipment.

18. The apparatus of claim 16, wherein the logical channel identifier indicates a common control channel service data unit size.

19. The apparatus of claim 16, wherein the logical channel identifier comprises a value associated with reduced capability user equipment.

20. The apparatus of claim 16, wherein the logical channel identifier is identified by a codepoint or an index.

* * * * *